United States Patent
King, Jr. et al.

(10) Patent No.: US 7,483,268 B1
(45) Date of Patent: Jan. 27, 2009

(54) DISK DRIVE CARRIER

(75) Inventors: Joseph P. King, Jr., Sterling, MA (US); Gerald J. Cote, Upton, MA (US); W. Brian Cunningham, Westborough, MA (US); Lawrence J. Feroli, W. Townsend, MA (US); C. Ilhan Gundogan, Lexington, MA (US)

(73) Assignee: EMC Corporation, Hopkinton, MA (US)

( * ) Notice: Subject to any disclaimer, the term of this patent is extended or adjusted under 35 U.S.C. 154(b) by 299 days.

(21) Appl. No.: 11/536,033

(22) Filed: Sep. 28, 2006

(51) Int. Cl.
*G06F 1/16* (2006.01)

(52) U.S. Cl. .................... 361/685; 312/223.1; 312/331; 248/682

(58) Field of Classification Search ................ 361/685; 312/223.1, 331; 248/683
See application file for complete search history.

(56) References Cited

U.S. PATENT DOCUMENTS

| | | | | |
|---|---|---|---|---|
| 5,588,728 A * | 12/1996 | Eldridge et al. | .......... | 312/332.1 |
| 6,058,016 A * | 5/2000 | Anderson et al. | ........... | 361/727 |
| 6,356,441 B1 * | 3/2002 | Claprood | ..................... | 361/685 |
| 6,487,071 B1 * | 11/2002 | Tata et al. | ................... | 361/685 |
| 6,515,854 B1 * | 2/2003 | Claprood | ..................... | 361/685 |
| 6,560,098 B1 * | 5/2003 | Beinor et al. | ............... | 361/685 |
| 6,565,163 B2 * | 5/2003 | Behl et al. | ................ | 312/223.1 |
| 6,636,422 B1 * | 10/2003 | Tanzer et al. | ................ | 361/687 |
| 6,850,410 B2 * | 2/2005 | Peeke et al. | ................. | 361/685 |
| 6,927,973 B2 * | 8/2005 | Song et al. | .................. | 361/685 |

* cited by examiner

*Primary Examiner*—Lisa Lea-Edmonds
(74) *Attorney, Agent, or Firm*—Guerin & Rodriguez, LLP; Michael A. Rodriguez (57) ABSTRACT

Described is a disk drive assembly and method for constructing same. The disk drive assembly includes a carrier-less disk drive having opposite sides, each with at least one hole. A carrier holds the disk drive. The carrier includes a frame around three sides of the disk drive. The frame has a base and opposing sidewalls. Each sidewall has an integrally formed pin that enters a corresponding hole in a side of the disk drive to position the disk drive within the frame. Coupled to the frame where each sidewall terminates is a clip. The clip provides a fourth side to the frame opposite the base and causes the sidewalls to hold the disk drive tightly therebetween. An injector-ejector mechanism can be rotatably coupled to the clip for pivotal movement between open and closed positions. Such movement urges the disk drive assembly out of and into a chassis bay.

25 Claims, 14 Drawing Sheets

DISK DRIVE CARRIER

FIELD OF THE INVENTION

The present invention relates generally to data storage systems. More particularly, the present invention relates to a carrier for a disk drive for use in data storage systems.

BACKGROUND

Enterprises in the data storage industry perpetually face demand from their customers to produce storage solutions that achieve ever-increasing data storage density. One approach to achieving high storage density is to pack as many disk drives as possible into a disk array enclosure. Ideally, each disk drive can be carrier-less, thereby minimizing the enclosure area occupied by any given disk drive.

This approach, however, is fraught with difficulties. For example, spacing between disk drives installed in neighboring chassis bays is often too small to permit personnel, limited to use of their fingertips, to establish a firm grasp of an individual disk drive. Thus, such personnel can have difficulties removing a disk drive from a chassis, not being able to apply sufficient extracting force to overcome the resistance of mated connectors between the disk drive and an enclosure midplane. Inserting a disk drive into the midplane can also become an imprecise art; personnel may not insert the disk drive sufficiently far to make adequate electrical contact. In addition, some disk drives require a companion "personality card" that determines the functionality of the disk drive. A difficulty posed by a carrier-less disk drive is how to package the personality card with the disk drive so that both may be installed together in a chassis bay.

Using a carrier for the disk drive can mitigate some of these difficulties, albeit with tradeoffs. Disk drives with carriers generally occupy more enclosure area than carrier-less disk drives do. The use of carriers thus runs contrary to efforts to increase storage density. Further, carriers may introduce complexity and expense to the constructing disk drive assemblies, often involving several small, hard-to-handle hardware components, such as screws and rivets.

SUMMARY

In one aspect, the invention features a disk drive assembly comprising a carrier-less disk drive and a disk drive carrier holding the disk drive. The disk drive has opposite sides, with each side having at least one hole formed therein. The disk drive carrier includes a frame and a clip coupled to the frame. The frame is around three sides of the disk drive. The frame has a base and opposing sidewalls spatially separated by the base. Each sidewall has an integrally formed pin that enters a corresponding hole in one of the opposite sides of the disk drive to position the disk drive within the frame. The clip is coupled to the frame where each sidewall terminates. The clip provides a fourth side to the frame opposite the base and causes the sidewalls of the frame to hold the disk drive tightly therebetween.

In another aspect, the invention features a data storage apparatus comprising a chassis and a disk drive assembly installed in one of the bays of the chassis. The disk drive assembly comprises a carrier-less disk drive and a disk drive carrier holding the disk drive. The disk drive has opposite sides, with each side having at least one hole formed therein. The disk drive carrier includes a frame and a clip coupled to the frame. The frame is around three sides of the disk drive. The frame has a base and opposing sidewalls spatially separated by the base. Each sidewall has an integrally formed pin that enters a corresponding hole in one of the opposite sides of the disk drive to position the disk drive within the frame. The clip is coupled to the frame where each sidewall terminates. The clip provides a fourth side to the frame opposite the base and causes the sidewalls of the frame to hold the disk drive tightly therebetween.

In still another aspect, the invention features a method for assembling a disk drive assembly. An injector-ejector is rotatably coupled to one end of a clip. One end of the clip is coupled to one of two opposing sidewalls of a three-sided carrier frame. A disk drive is positioned between the opposing sidewalls of the carrier frame so that integrally formed pins extending from interior surfaces of the opposing sidewalls can enter holes in opposite sides of the disk drive. An opposite end of the clip is coupled to the other of the opposing sidewalls of the carrier frame, with the pins of the sidewalls entering the holes in the opposite sides of the disk drive, to cause the sidewalls to hold the disk drive tightly in position therebetween.

BRIEF DESCRIPTION OF THE DRAWINGS

The above and further advantages of this invention may be better understood by referring to the following description in conjunction with the accompanying drawings, in which like numerals indicate like structural elements and features in the various figures. The drawings are not meant to limit the scope of the invention. For clarity, not every element may be labeled in every figure. The drawings are not necessarily to scale, emphasis instead being placed upon illustrating the principles of the invention.

DETAILED DESCRIPTION

Disk drive assemblies embodying the invention include a carrier holding a disk drive. The carrier borders the disk drive like a picture frame around a painting. The frame of the carrier is about as wide as the disk drive is thick, and therefore adds no thickness to the disk drive. Accordingly, the carrier presents no impediment to efforts to increase storage density: by not being wider than the thickness of the disk drive, the carrier does not limit the minimal spacing between neighboring disk drives. The carrier also has an injector-ejector mechanism that enables personnel to insert and remove the disk drive assembly from a chassis bay. In addition, assembly of the disk drive assembly is achievable without the use of hardware components, such as screws, rivets, and pins.

Figure 1:
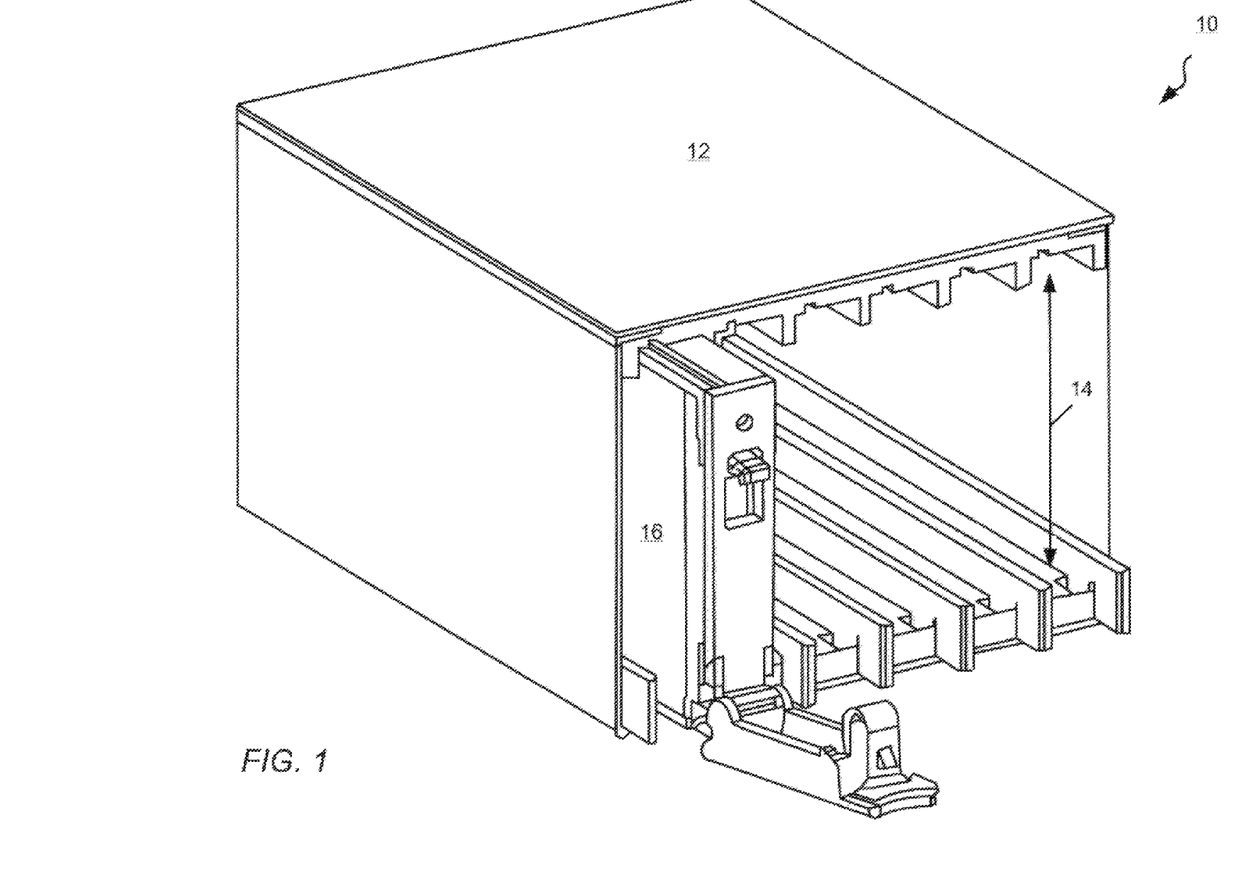
FIG. 1 is an isometric view of an embodiment of a data storage apparatus constructed in accordance with the invention, the data storage apparatus including an embodiment of a chassis and an embodiment of a disk drive assembly.

FIG. 1 shows an embodiment of a data storage apparatus 10 constructed in accordance with the invention, for use in data storage systems. The data storage apparatus 10 includes a chassis 12 with a plurality of bays 14. Partially inserted in one of the bays is a disk drive assembly 16. When fully inserted into the bay 14, the disk drive assembly 16 electrically plugs into a midplane (not shown) disposed behind the chassis 12. The size of the chassis 12 is exemplary; in the practice of the invention, other embodiments of chassis can have fewer or more bays than the six bays shown.

Figure 2:
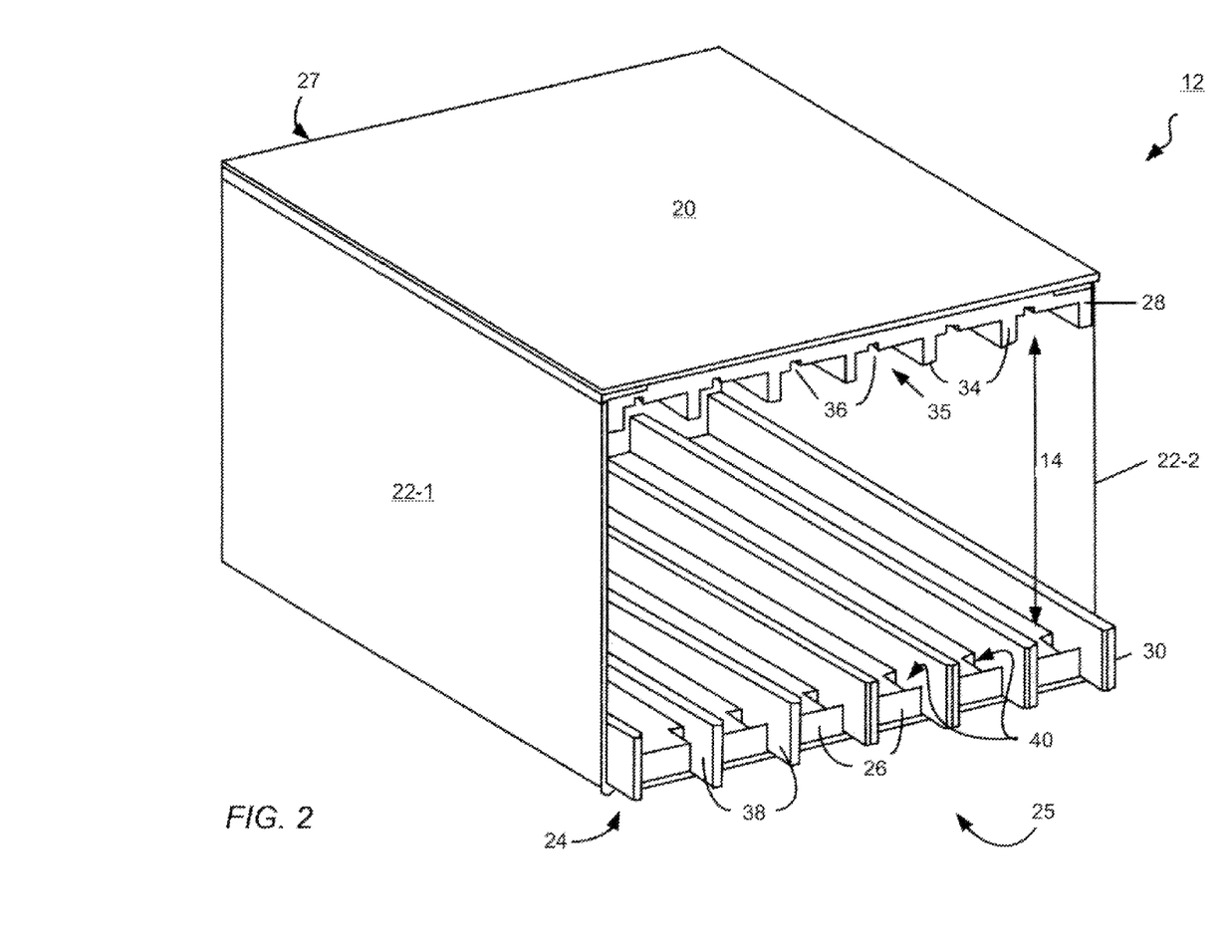
FIG. 2 is an isometric view of the chassis of the data storage apparatus.

FIG. 2 shows the chassis 12 in detail. The chassis 12 includes a top panel 20, opposing side panels 22-1, 22-2 (generally, 22), and a bottom panel 24. In general, such panels 20, 22, 24 are of metal construction. At the front 25 of the chassis 12, an edge of the bottom panel 24 bends upwards to produce an upturned lip 26 spanning the width of the chassis 12. Abutting the top panel 20 is an upper bay tray 28; a lower bay tray 30 abuts the bottom panel 24. Rivets can secure the bay trays 28, 30 to the top and bottom panels 20, 24, respectively. Alternatively, to avoid the use of hardware components, the top and bottom panels 20, 24 can have openings to receive snaps projecting from the upper and lower bay trays 28, 30.

The upper bay tray 28 includes a plurality of drive guides 34 that extend from the front 25 to the back 27 of the chassis 12. Each pair of adjacent drive guides 34 defines an upper track 35 of a disk drive bay 14. Each track 35 has a groove 36 extending the length thereof. The groove 36 can be central to the track 35, or offset from center to one side or the other.

The lower bay tray 30 includes a plurality of drive guides 38 that extend from the front 25 to the back 27 of the chassis 12. Each pair of adjacent drive guides 38 defines a lower track 39 of a disk drive bay 14 opposite a corresponding upper track 35. The upper and lower drive guides 34, 38 determine the spacing between adjacent disk drives. This spacing produces avenues for cooling air to flow past the disk drives. In one embodiment, the upper and lower bay trays are constructed of PC/ABS (polycarbonate-ABS blend) material.

Each lower track 39 has a pair of slots 40 near the front 25 of the chassis 12 adjacent the upturned lip 26. (A drive guide 38 obscures one of such slots 40 in FIG. 2). Projecting beyond the front edges of the side panels 22, each drive guide 38 has a notch for straddling the upturned lip 26. The terms top, bottom, upper, lower, front, and back, as used herein, are relative terms used with respect to the depiction of the chassis 12 as shown in the Figures, and are not meant to describe any particular orientation of the chassis 12 when used within a data storage system.

Figure 3:
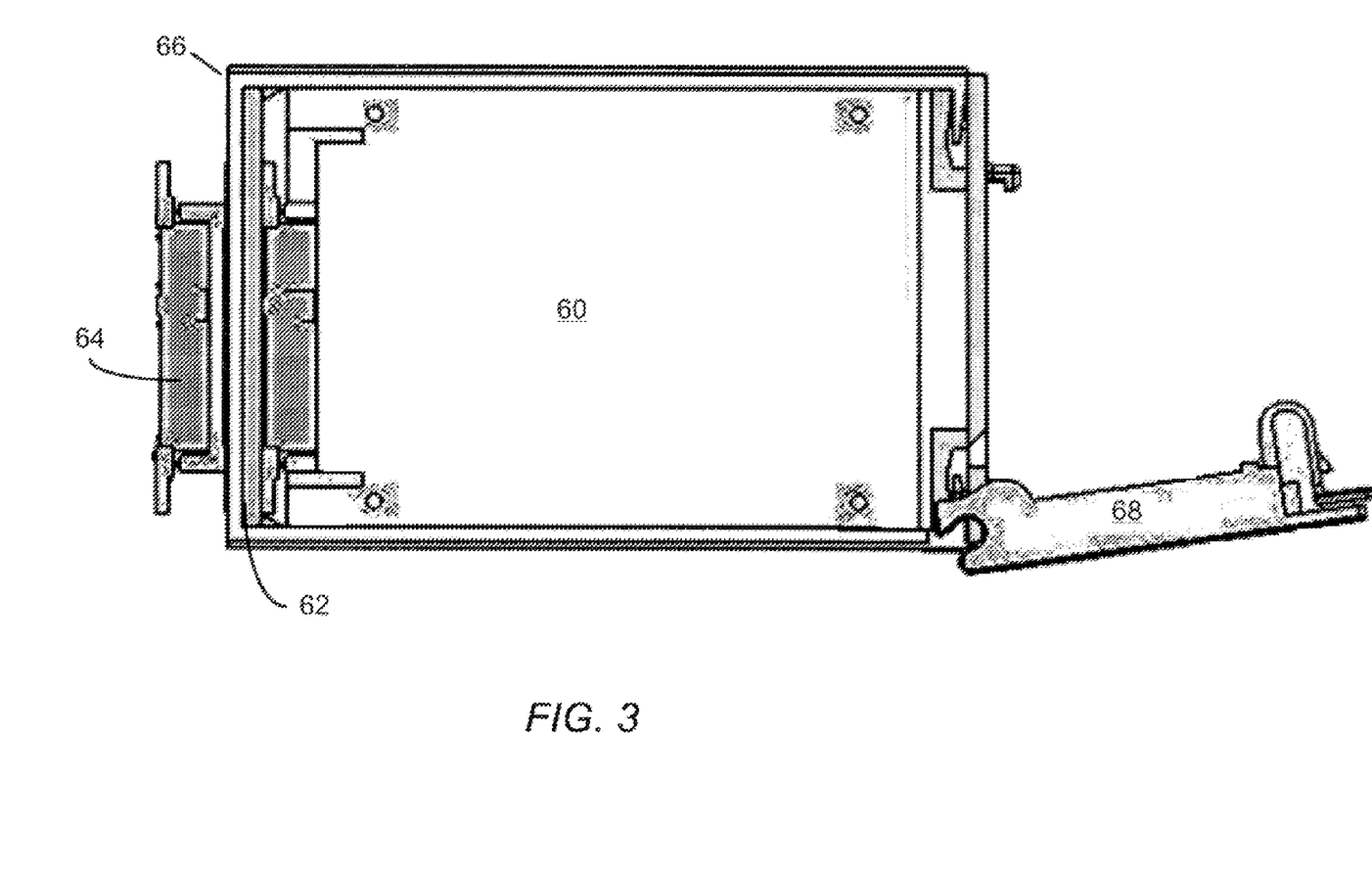
FIG. 3 is a side view of the disk drive assembly of the data storage apparatus.

FIG. 3 shows a side view of the disk drive assembly 16 including a carrier-less disk drive 60 electrically coupled at one end to an adapter board 62. In one embodiment, the disk drive 60 is a 2.5" disk drive (e.g., model number ST973401SS, manufactured by Seagate Technology of Scotts Valley, Calif.). The other side of the adapter board 62 is electrically coupled to a midplane connector 64. In general, the adapter board 62 provides an electrical and mechanical interfaces between the disk drive 60 and the midplane (through the midplane connector 64), and facilitates communications between the disk drive 60 and control cards, not shown, in the data storage system (e.g., link control cards (LCCs) or bridge control cards (BCCs)). Other embodiments of the disk drive assembly 16 can omit the adapter board 62, having the disk drive 60 electrically couple to the midplane connector 64 directly.

The disk drive assembly 16 also includes a disk drive carrier 66 that frames the disk drive 60 and adapter board 62 and includes an injector-ejector mechanism 68. Here, the injector-ejector 68 is shown in the closed and locked position, coupled to the end of the carrier 66 opposite the midplane connector 64.

Figure 4:
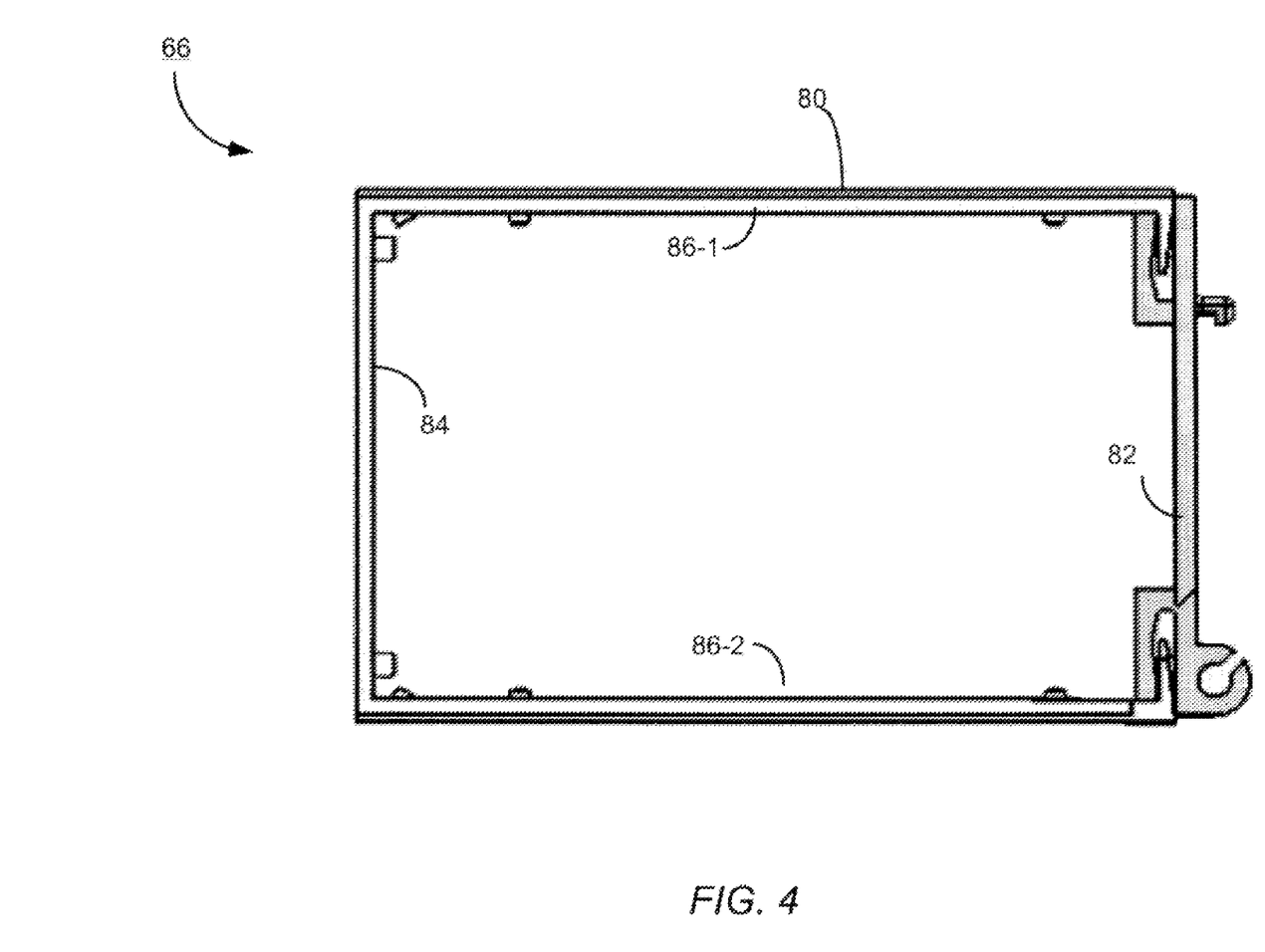
FIG. 4 is a side view of an embodiment of a disk drive carrier of the disk drive assembly.
Figure 5:
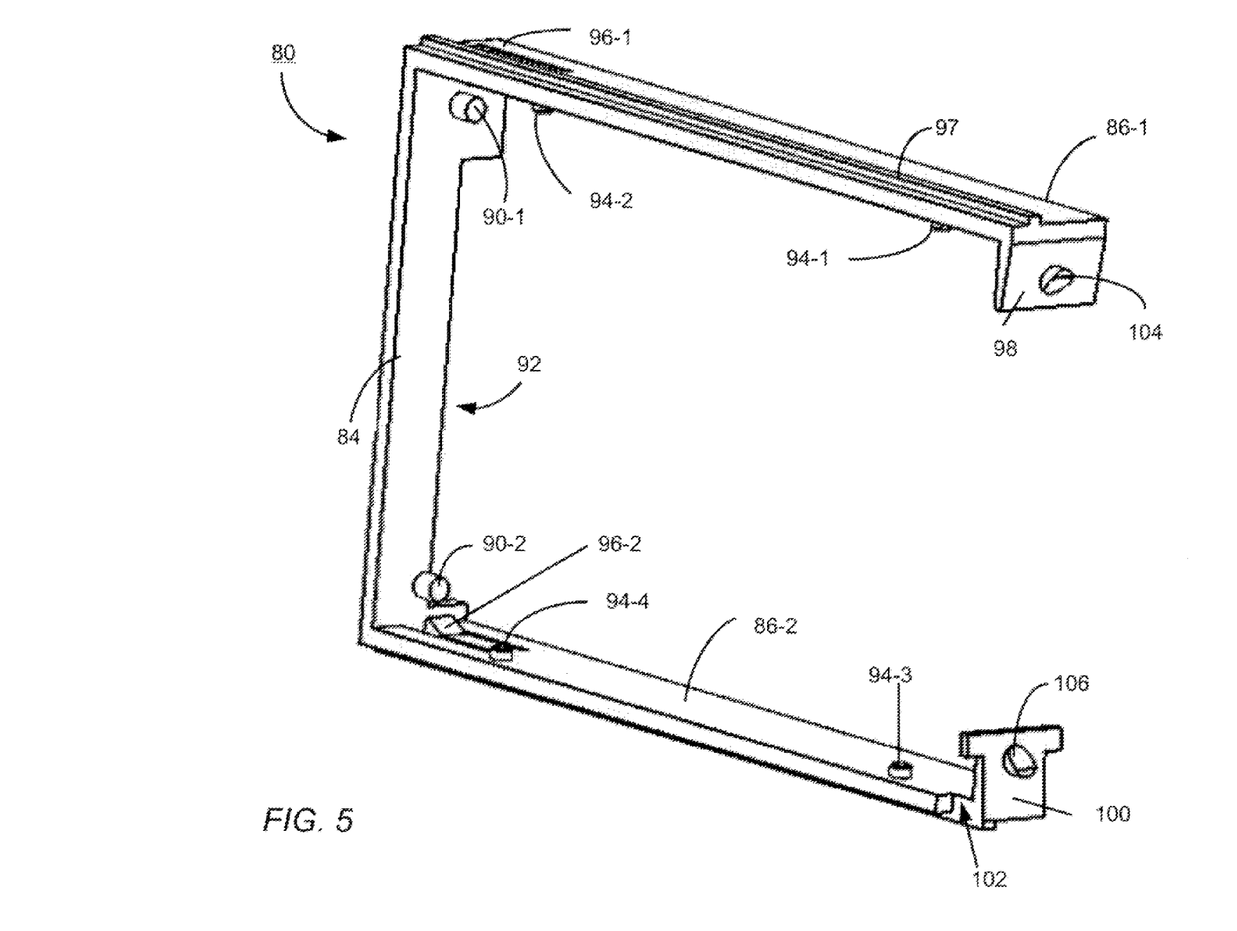
FIG. 5 is an isometric view of an embodiment of a carrier frame of the disk drive carrier.

FIG. 4 shows a side view of an embodiment of the disk drive carrier 66 including a three-sided frame 80 attached to a frontal clip 82. The frame 80 is integrally formed and includes a base 84 separating sidewalls 86-1, 86-2 (generally, 86). As shown in FIG. 5, the base 84 of the three-sided frame 80 includes a pair of integrally formed pins 90-1, 90-2 (generally, 90) extending generally orthogonally from an interior surface thereof. The particular locations of the pins 90 are for entering holes in the adapter board 62. The base 84 also has a cutout 92 for receiving a portion of the midplane connector 64.

Each sidewall 86 has a pair of integrally formed pins 94 at opposite ends extending generally orthogonally from an interior surface of that sidewall 86: sidewall 86-1 has pins 94-1, 94-2; sidewall 86-2 has pins 94-3, 94-4. The particular locations of the pins 94 are for entering tapped holes in the sides of the disk drive 60, which are, in general, a standard disk drive feature. Each sidewall 86 also has a flexible, depressible snap 96 extending from an interior surface near one end of that sidewall 86: sidewall 86-1 has snap 96-1 disposed between pin 94-2 and the base 84; and sidewall 86-2 has snap 96-2 disposed between pin 94-4 and the base 84. The snaps 96 and pins 90 of the base 84 cooperate to align and secure the adapter board 62 against the base 84 (as shown in FIG. 3).

Extending along a length of an exterior surface of the sidewall 86-1 is a ridge 97, the thickness and location thereof on the exterior surface of the sidewall 86-1 being such that the ridge 97 closely enters a groove 36 (FIG. 2) when the disk drive assembly 16 enters a bay 14 of the chassis 12. Although not present in the illustrated embodiment, the other sidewall 86-2 can have a ridge instead of, or in addition to, the ridge 97 of the sidewall 86-1. If both sidewalls have ridges, the locations of such ridges on their respective sidewalls should differ so that the disk drive assembly 16 is "polarized" or "keyed," i.e., there is only one orientation in which the assembly 16 can correctly enter a bay 14. In addition to determining the orientation for entering a bay, each ridge 97 provides structural support to the carrier 66.

Each sidewall 86-1, 86-2 terminates a respective post 98, 100. The posts 98, 100 extend inwardly from the ends of the sidewalls 86 at the end of the frame 80 opposite the base 84. On opposite edges of the post 100 is a cutout region 102, making a section of the post 100 narrower than the sidewall 86-2 from which the post 100 extends. The cutout regions 102 extend partially into the sidewall 86-2. Each post 98, 100 has a respective snap 104, 106 extending from an exterior surface thereof.

Figure 6A:
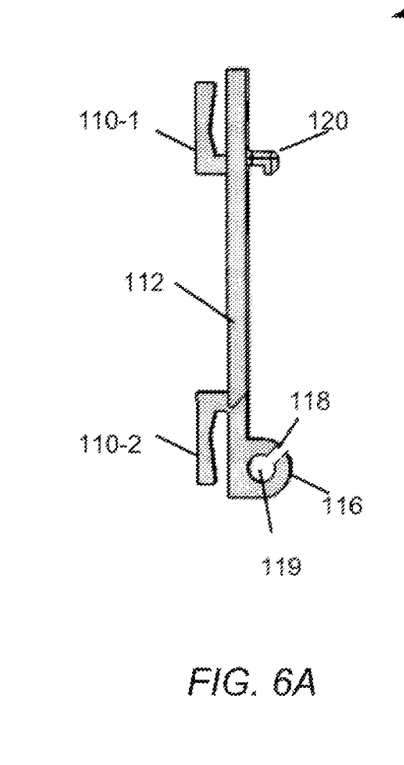
FIG. 6A, FIG. 6B, and FIG. 6C are side, front, and rear views, respectively, of an embodiment of a frontal clip of the disk drive carrier.
Figure 6B:
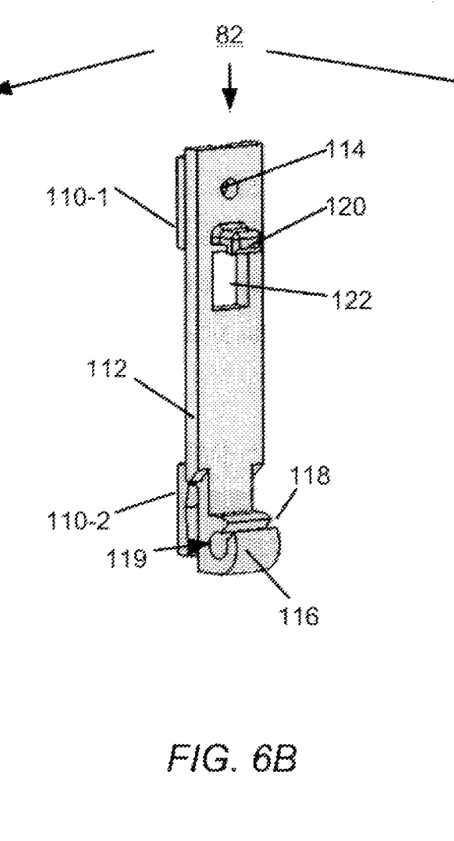
Figure 6C:
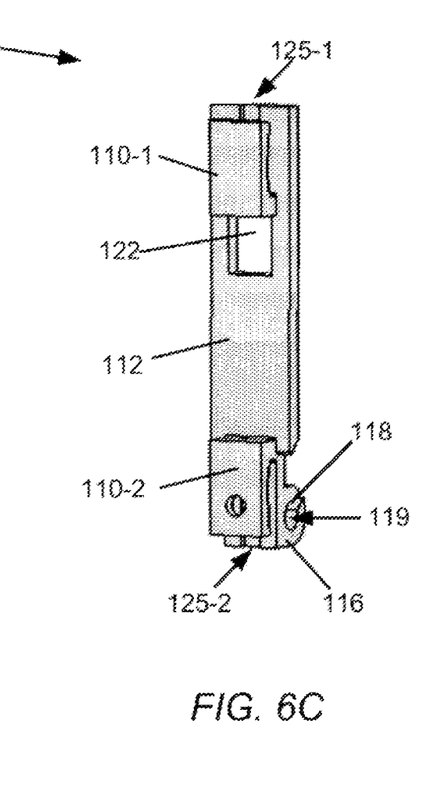

FIG. 6A, FIG. 6B, and FIG. 6C show an embodiment of the frontal clip 82 (FIG. 4); FIG. 6A shows a side view, FIG. 6B shows a front view, and FIG. 6C shows a rear view. The frontal clip 82 includes a pair of arms 110-1, 110-2 (generally, 110) extending from an interior side thereof. After projecting generally orthogonally from the clip body 112, each arm 110 bends orthogonally and extends generally parallel to the clip 82 in the direction of a clip end.

Each end of the clip 82 has an open-ended shallow groove 125-1, 125-2 (generally, 125) directly opposite the bent section of the arm 110. In the construction of the disk drive assembly 16, each post 98, 100 is slid into the tight gap between the bent section of an arm 110 and the clip body 112. The grooves 125 receive a respective snap 104, 106 on the posts 98, 100 of the three-sided frame 80. Each shallow groove 125 terminates at an opening 114 in the clip 82. (One of the openings 114 is not visible, being obscured by a coupling knob 116). When inserted into the gap, each post 98, 100 (and arm 110) flexes slightly away from the clip body 112 while its respective snap 104, 106 traverses a respective groove 125. Each post 98, 100 then locks in place when its respective snap 104, 106 reaches and snaps into the opening 114. Accordingly, the frontal clip 82 attaches to the frame 80 without the use of any hardware fasteners.

At one end of the clip body 112 is a coupling knob 116 for joining to the injector/ejector 68 (FIG. 3), described further below. The coupling knob 116 projects from a front side of the clip 82, having a rounded body with a radial slit 118. The radial slit 118 opens into a central bore 119. Also extending from the front side of the clip 82 is a hooked post 120 disposed above and adjacent a rectangular opening 122 in the clip body 112.

Figure 7:
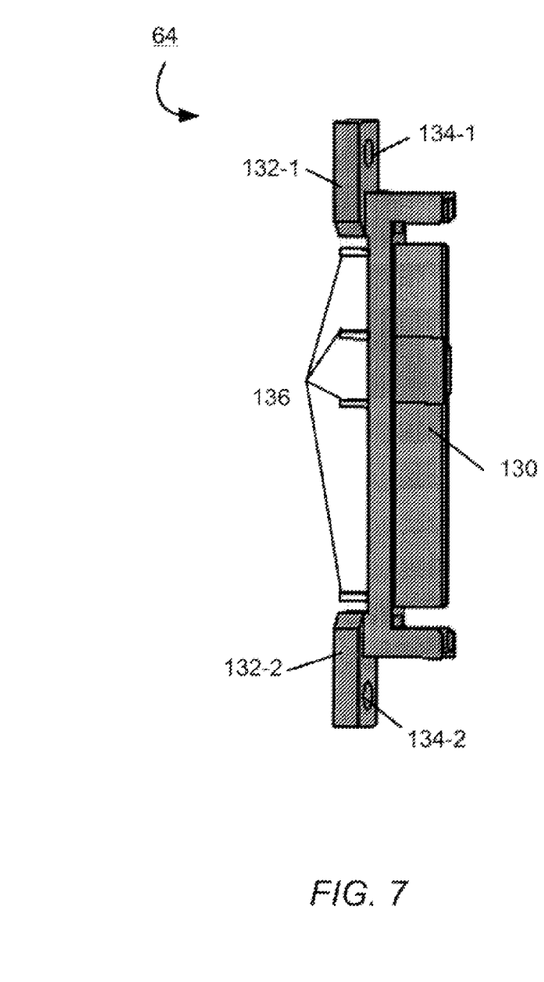
FIG. 7 is a side view of an embodiment of a midplane connector.

FIG. 7 shows a side view of an embodiment of the midplane connector 64 including an electrical connector body 130 for connecting to the midplane, electrical conducting pins 136 passing through the connector body 130, and a pair of flanges 132-1, 132-2 (generally, 132) on opposite ends of the connector body 130. Each flange 132-1, 132-2 has a respective opening 134-1, 134-2.

Figure 8A:
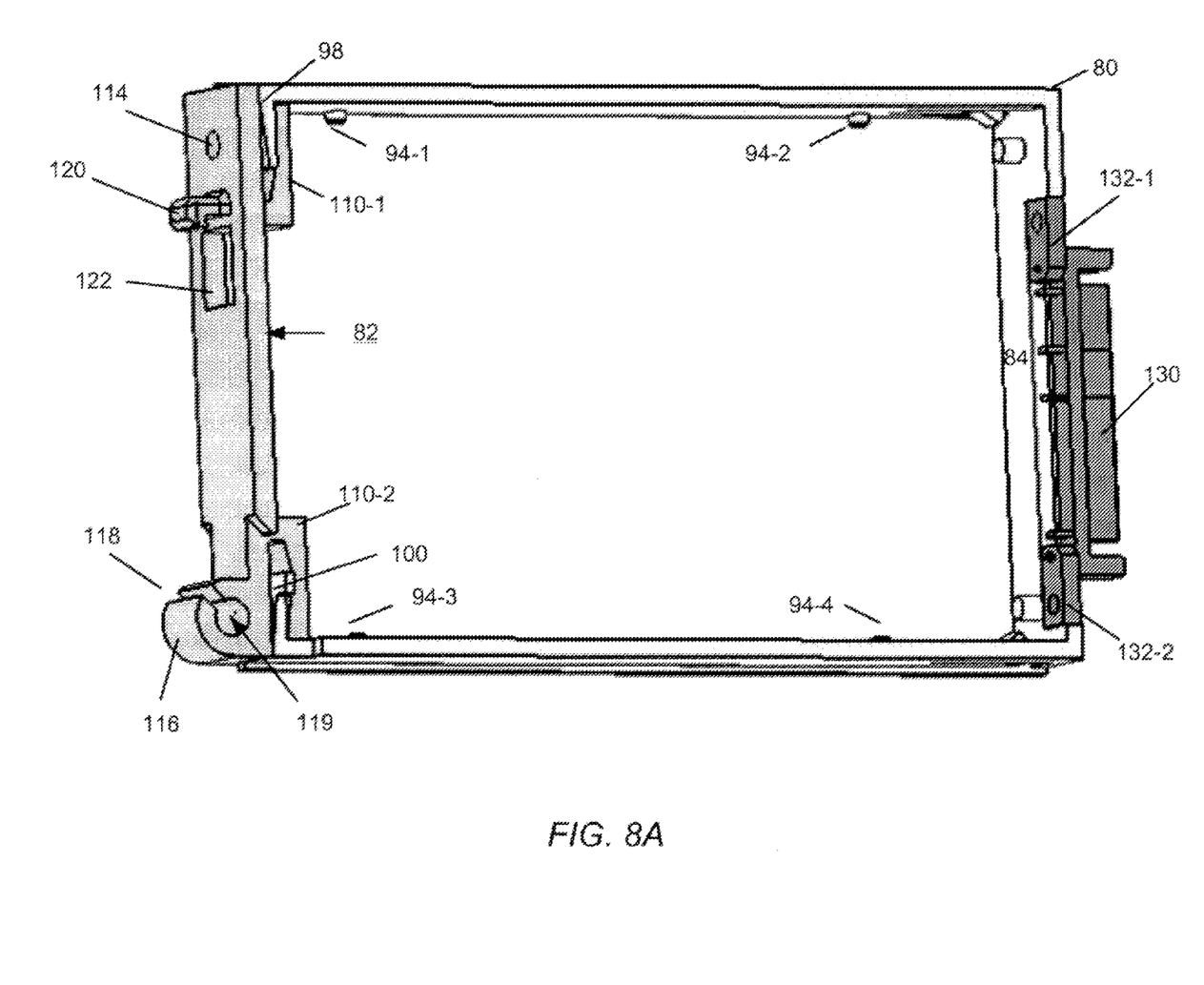
FIG. 8A is an isometric view of the midplane connector positioned within a cutout region of the carrier frame.

FIG. 8A shows a side view of the carrier frame 80 with the frontal clip 82 attached thereto and the midplane connector 64 situated within the cutout region 92 of the frame base 84. The length and width of the cutout region 92 approximate the length and width of the midplane connector 64 so that the midplane connector 64 fits closely therein. The thickness of the base 84 approximates the thicknesses of the connector flanges 132.

At the other end to the frame 80, the post 98 resides snugly between the arm 110-1 and the clip body 112. The snap 104 (unseen) sits within the opening 114 to lock the post 98 in place. Similarly, the post 100 resides snugly between the other arm 110-2 and the clip body 112, with the snap 106 sitting within the opening 114 (unseen within the central bore 119) and locking the post 100 in place.

Figure 8B:
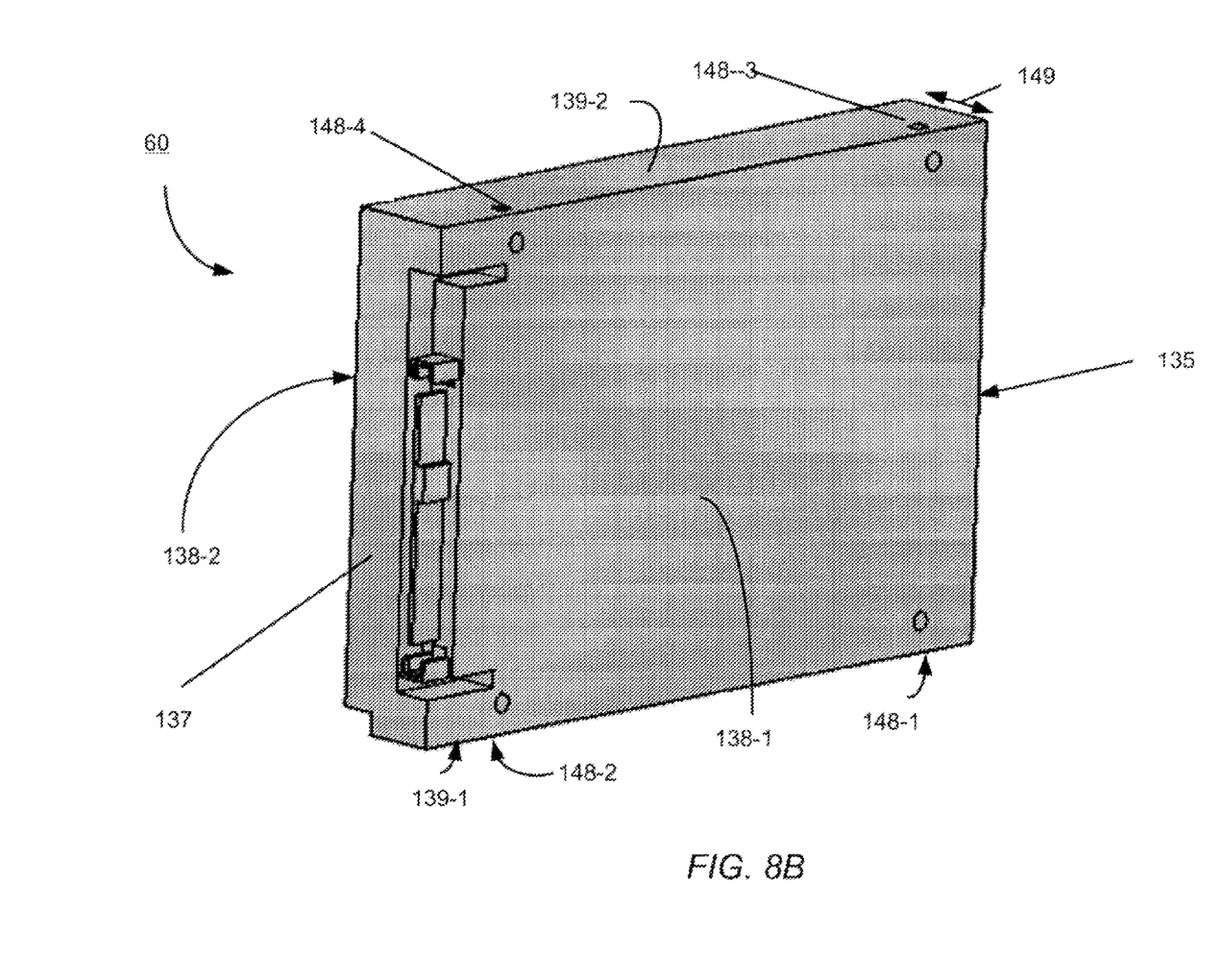
FIG. 8B is an isometric view of an embodiment of a disk drive.

FIG. 8B shows a side view of the disk drive 60 having a front side 135, a rear side 137 (with an electrical connector), opposite wide sides 138-1, 138-2, and opposite narrow sides 139-1, 139-2 (generally, 139). As defined herein, the thickness 149 of the disk drive 60 corresponds to the width of the narrow sides 139. Each narrow side 139 has a pair of tapped holes 148: side 139-1 has tapped holes 148-1, 148-2 (not visible, their approximate location depicted by arrows); side 139-2 has tapped holes 148-3, 148-4.

Figure 9:
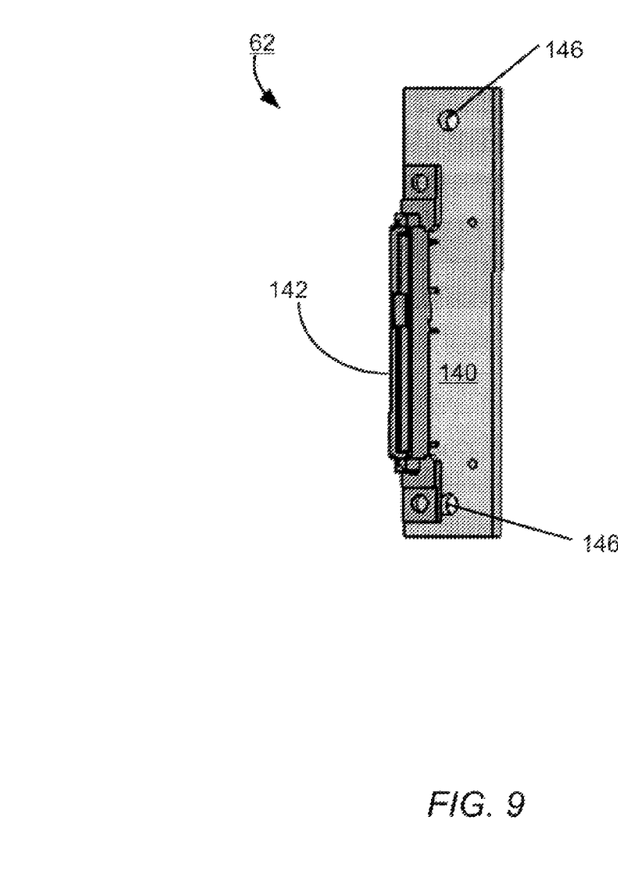
FIG. 9 is a front view of an embodiment of an adapter board.

FIG. 9 shows an embodiment of the adapter board 62 including a board body 140 and an electrical connector 142 attached to and extending generally orthogonally from one side of the body 140. The other side of the adapter board 62 has pin receptacles (not shown) extending generally orthogonally therefrom. Near each end of the adapter board 62 is a hole 146 formed therein. The adapter board 62 may also have active or passive circuitry (not shown), or combinations thereof.

Figure 10:
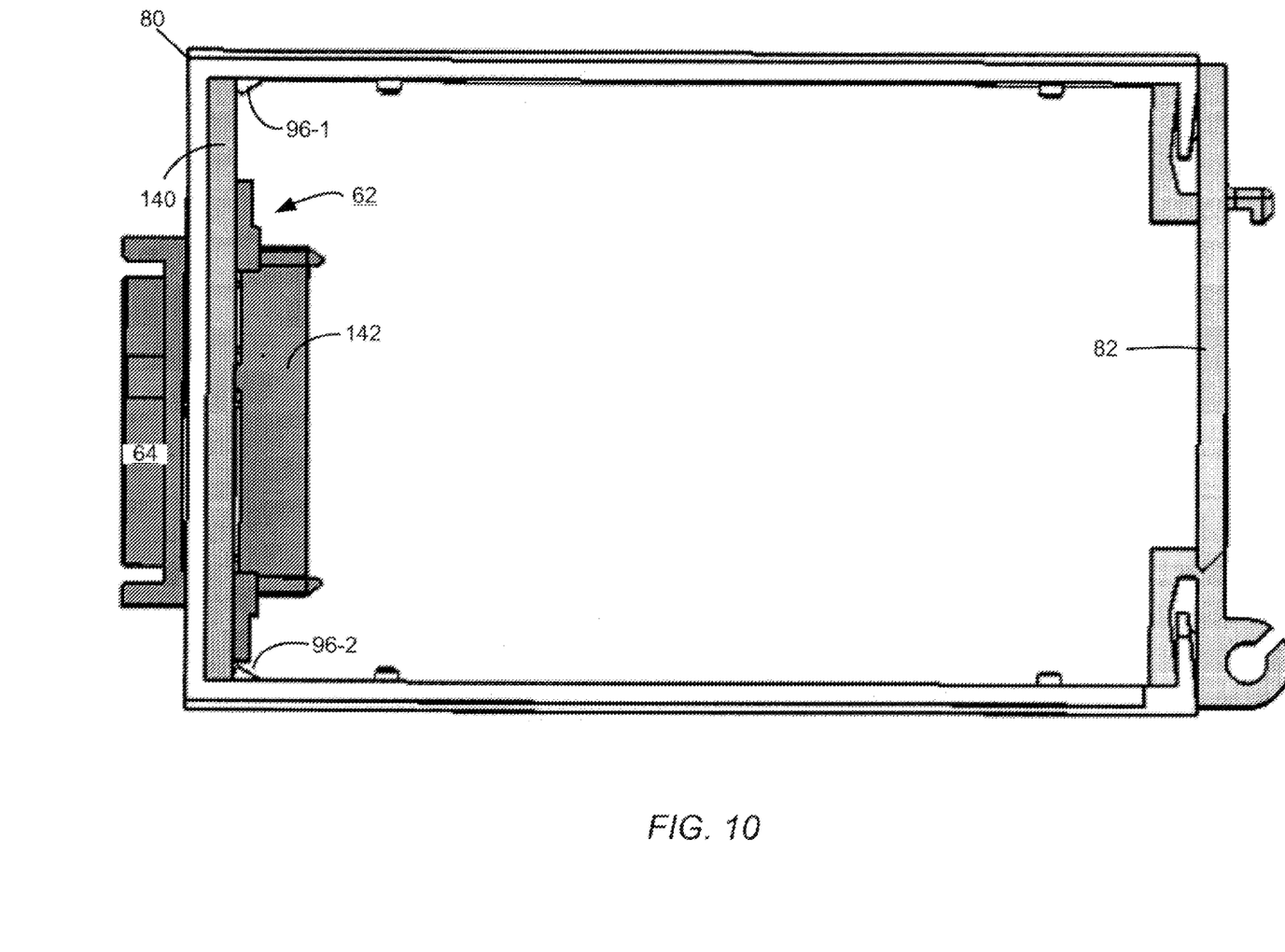
FIG. 10 is a side view of the carrier with the adapter board coupled thereto, and the midplane connector connected to the adapter board.

FIG. 10 shows an assembled carrier 66 (without an injector/ejector 68) with the adapter board 62 attached thereto. Wedged tightly between the pair of snaps 96 and the base 84 and with the alignment pins 90 of the base 84 within the holes 146 of the adapter board 62, the adapter board 62 securely abuts the base 84. The pin receptacles of the adapter board 62 receive the electrical pins 136 (FIG. 7) of the midplane connector 64, to establish electrical communication therebetween.

Figure 11A:
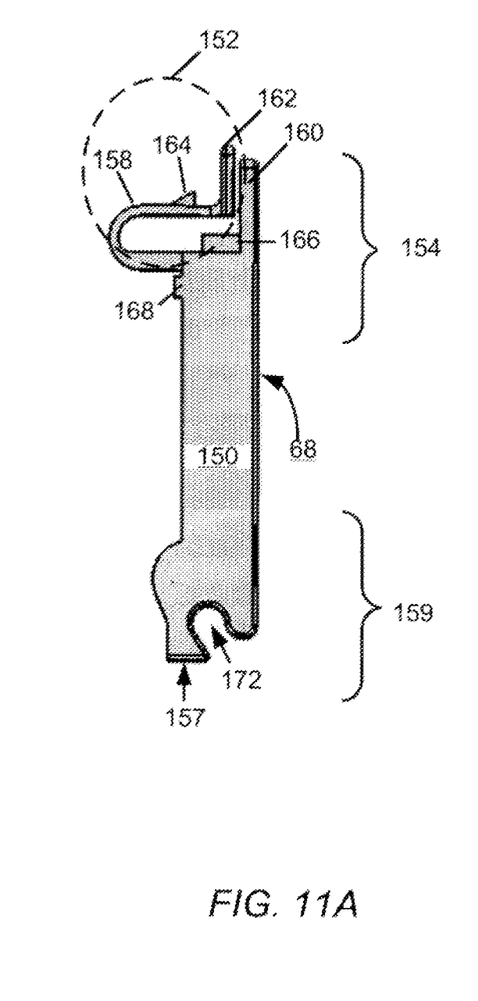
FIG. 11A, FIG. 11B, and FIG. 11C are side, rear, and front views, respectively, of an embodiment of an injector-ejector mechanism of the disk drive carrier.
Figure 11B:
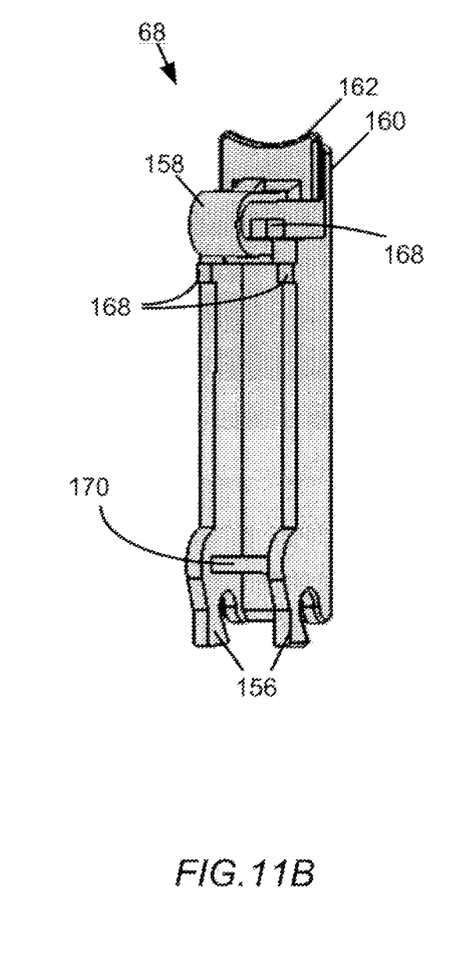
Figure 11C:
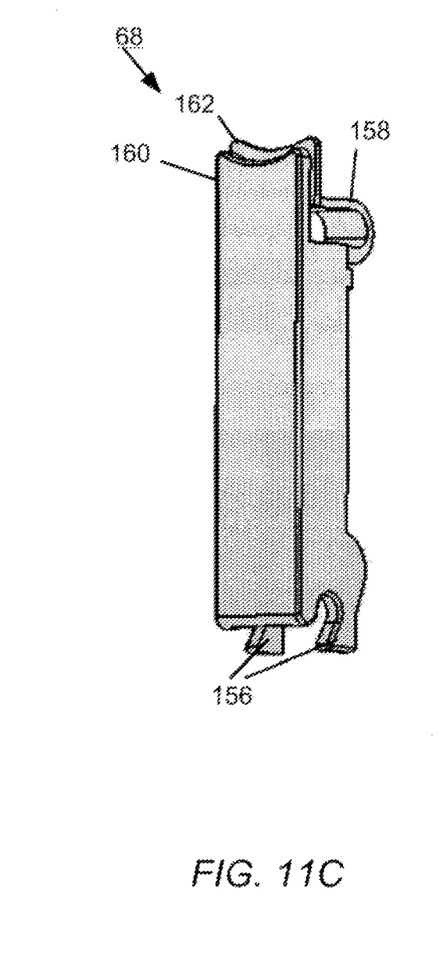

FIG. 11A, FIG. 11B, and FIG. 11C show an embodiment of the injector-ejector 68 (FIG. 3); FIG. 11A shows a side view, FIG. 11B shows a front view, and FIG. 11C shows a rear view. The injector-ejector 68 includes a body 150, a latch mechanism 152 at a first end 154 of the body 150, and legs 156 at the other end 159 of the body.

At the first end 154, the latch mechanism 152 includes a depressible open loop 158 attached at one end to the body 150. The loop 158 extends orthogonally away from the body 150, turns back over itself and the body 150, and then turns orthogonally away from the body 150, parallel to and spatially separated from an extension 160. The unattached end of the loop 158 terminates with a concave edge 162 (shaped for receiving a fingertip). The extension 160 also has a concave edge shaped for a fingertip. When the loop 158 is not depressed, the concave edge 162 at the unattached end of the loop 158 rises higher than the edge of the extension 160.

A catch 164 projects from an outer surface of the loop 158, near the location where loop 158 turns and begins to extend parallel to the body extension 160. Adjacent the loop 158, near the location where loop 158 initially extends from the body 150, are a pair of other stops 168. At the second end 159 are circular cutouts 170 adjacent the legs 156.

A crossbeam 170 spans the legs 156. To couple the injector-ejector 68 to the clip 82, the crossbeam 170 slides lengthwise through the slot 119 into the central core 119. The crossbeam 170 within the core 119 extends along the pivot axis 180 about which the injector-ejector 68 rotates. Rotation of the injector-ejector 68 turns the crossbeam 170 so that the crossbeam 170 cannot be drawn out of the radial slit 118 (i.e., there is only one orientation of the injector-ejector 68 relative to the clip 82 that allows detachment; this position is determined by the angle of the radial slit 118. Detachment is not possible when the injector-ejector 68 is in a fully open or fully closed position.). Accordingly, the injector-ejector 68 couples to the frontal clip 82 without the use of any hardware fasteners.

Figure 12A:
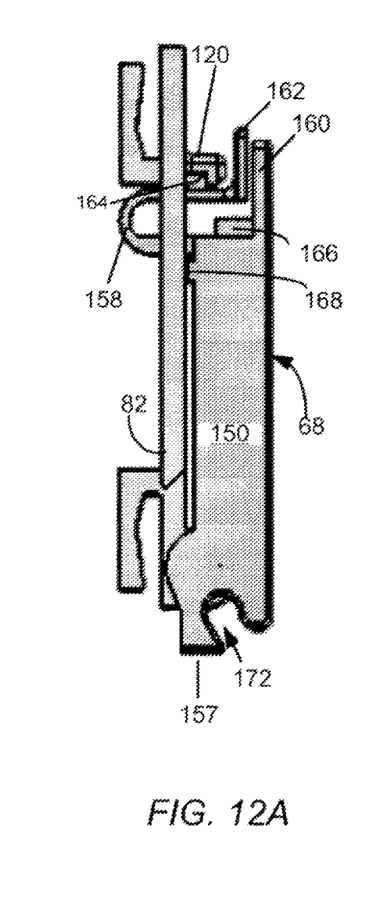
FIG. 12A is a side view of the injector-ejector mechanism coupled to the frontal clip and in the closed position.

FIG. 12A shows a side view of the injector-ejector 68 secured to the clip 82 and rotated into the closed position. In the closed position, the loop 158 penetrates the opening 122 in the clip body 112, and the catch 164 latches onto the hook post 120. The stops 168 abut the side of the clip body 112 to prevent further penetration of the loop 158 into the opening 122.

To disengage the catch 164 from the hook post 120, an individual can push down the concave edge 162 with a finger, and then draw the injector-ejector 168 away from the clip 82. The stop 166 on the injector-ejector body 150 limits the degree to which the individual may depress the concave edge 162. The edge of the extension 160 also tends to serve this function.

Figure 12B:
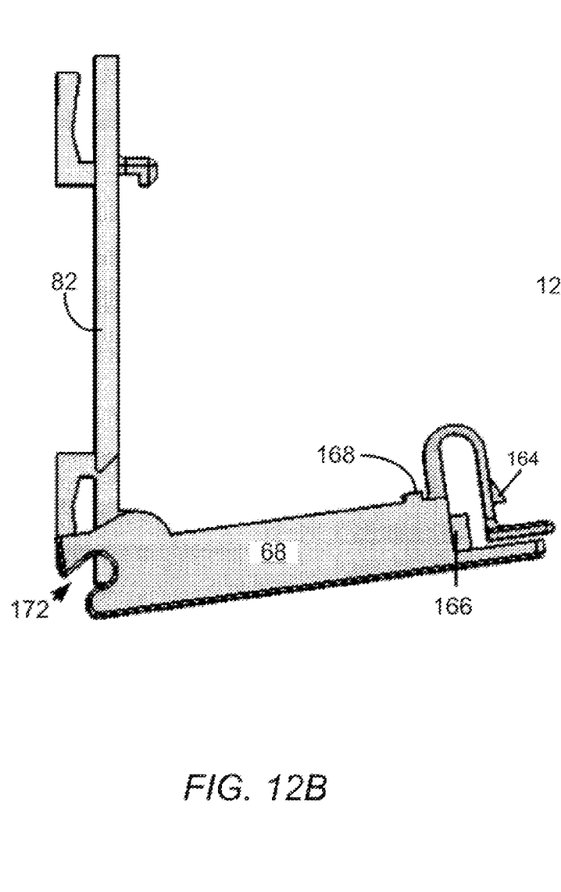
FIG. 12B and FIG. 12C are front and isometric views of the injector-ejector mechanism coupled to the frontal clip in an closed position.
Figure 12C:
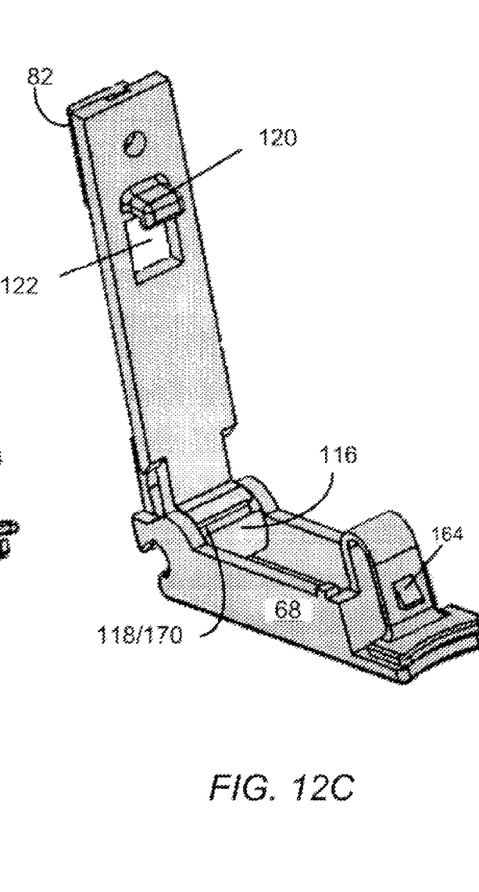

FIG. 12B and FIG. 12C show the injector-ejector 68 being secured to the clip 82 in an open position. FIG. 12B illustrates a side view and FIG. 12C illustrates a front view. In FIG. 12C, the crossbeam 170 can be seen through the radial slit 118.

Figure 13:
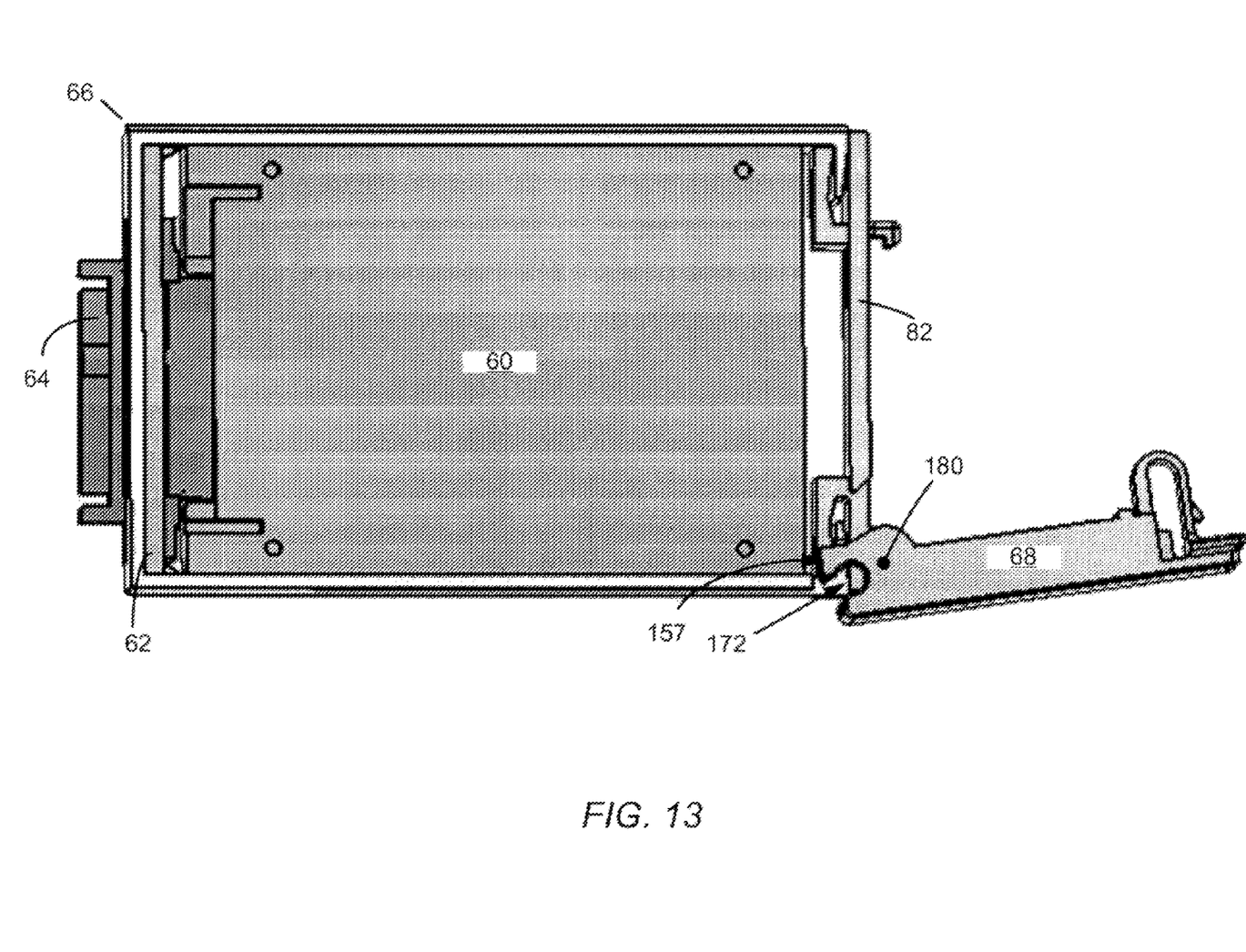
FIG. 13 is a side view of the disk drive assembly with the injector-ejector mechanism in the open position.

During installation, the disk drive assembly 16 is inserted into one of the bays 14 of the chassis 12. To insert the disk drive assembly 16, the ridges 97 on one or both of the frame sidewalls 86 enter corresponding grooves 36 in the bay tracks. When inserting the disk drive assembly 16 into the bay 14, the injector-ejector 68 needs to be in an open position, such as is shown in FIG. 13. When in the open position, the legs 156 of the injector-ejector 68 extend past the plane of the clip body 112. (The legs 156 are able to extend beyond the plane of the clip body 112 because the clip body 112 is narrower at the coupling knob 116 than at upper other end).

The disk drive assembly 16 penetrates the chassis 12 until the feet 157 of the legs 156 meet the upturned lip 26 of the chassis 12. At this juncture, the disk drive assembly 16 is denied further entry into the bay 14 until the injector-ejector 68 is rotated towards the closed position. This rotation causes the edge of the upturned lip 26 to enter the circular cutout 172 of the injector-ejector 68 and the inside edges of the legs 156 to pull against the backside of the upturned lip 26. This pulling draws the disk drive assembly 16 farther into the bay 14 and provides sufficient force for the midplane connector 64 to connect to the midplane. The disk drive assembly 16 locks in place when the catch 164 of the latch mechanism 152 engages the hook post 120 of the frontal clip 82 (i.e., the injector-ejector 68 rotates into the closed position).

To remove the disk drive assembly from the bay 14, an individual presses down on the concave edge 162 of the latch mechanism 152. This movement causes the catch 164 to disengage from the hook post 120. As the individual continues to rotate the injector-ejector 68 into an open position, the lower end of the injector-ejector 68 operates like a lever and pushes against the front side of the upturned lip 26 of the chassis 12. This pushing operates to pull and disconnect the midplane connector 64 from the midplane and to draw the disk drive assembly 16 from the bay 14.

Figure 14:
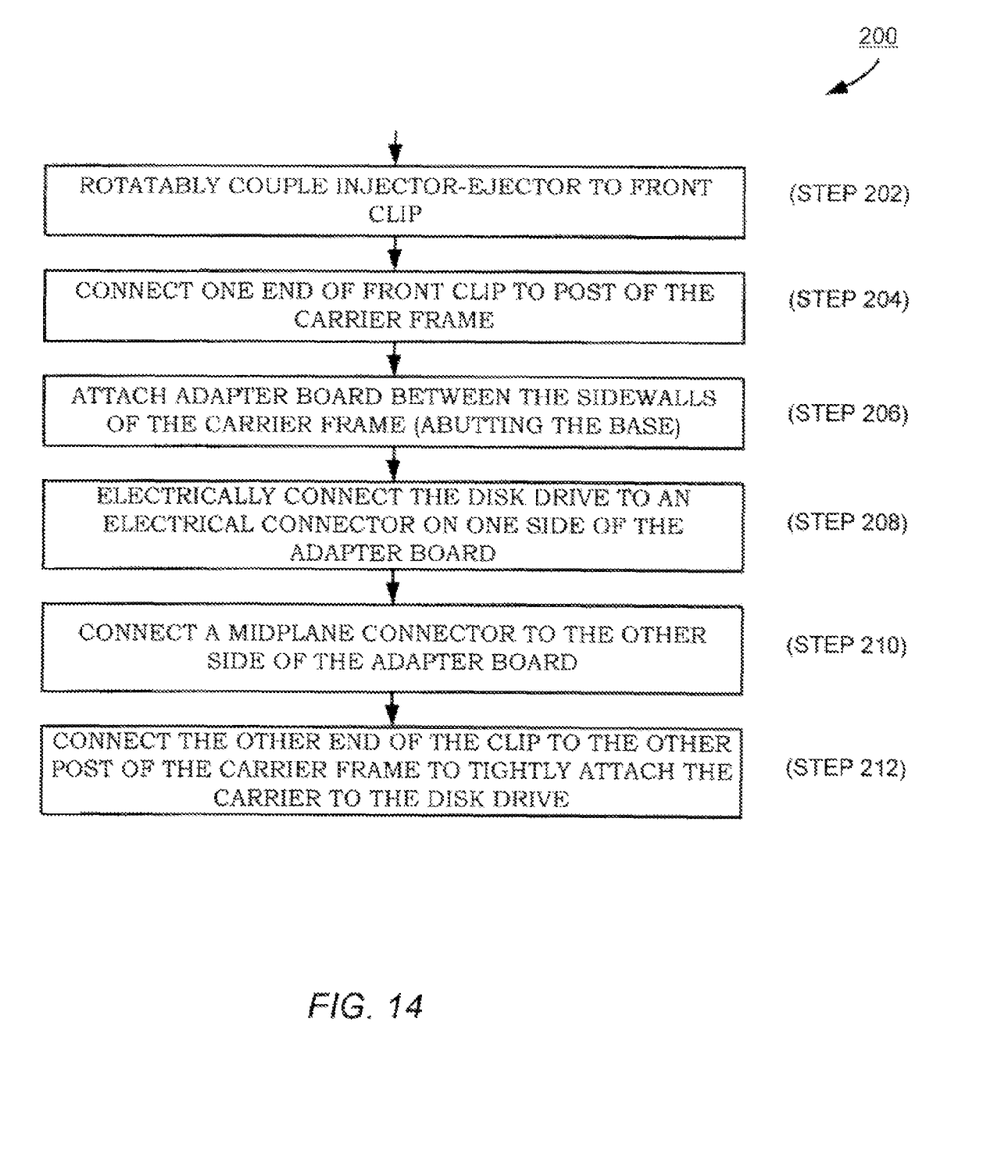
FIG. 14 is an embodiment of a process for assembling the disk drive assembly.

FIG. 14 shows an embodiment of a process 200 for assembling the disk drive assembly 16. The order of steps in this process 200 is exemplary; some of the steps may be performed in a different order than that described. At step 202, the injector-ejector 68 is rotatably coupled to one end of the clip 82. The clip 82 is connected (step 204), at one end, to the post 100 of the carrier frame 80. The adapter board 62 is attached (step 206) between the sidewalls 86 of the carrier frame 80 against the base 84. The disk drive 60 is electrically connected (step 208) to an electrical connector on one side of the adapter board 62. A midplane connector 64 is connected (step 210) to the other side of the adapter board 62. With the disk drive 60 positioned between the sidewalls 86 of the carrier frame 80 so that the pins 94 extending from the sidewalls 86 can enter the holes 148 (FIG. 8B) in the sides of the disk drive 60, the other end of the clip 82 is connected (step 212) to the post 98 of the carrier frame 80. Connecting this other end tightens the carrier 66 around the disk drive 60, which is positioned immovably between the sidewalls 86 of the frame 80 because the pins 94 are within the holes 148.

While the present invention has been shown and described herein with reference to specific embodiments thereof, it should be understood by those skilled in the art that variations, alterations, changes in form and detail, and equivalents may be made or conceived of without departing from the spirit and scope of the invention. Accordingly, the scope of the present invention should be assessed as that of the appended claims and by equivalents thereto.

What is claimed is:

1. A disk drive assembly comprising:
   a carrier-less disk drive having opposite sides, each side having at least one hole formed therein; and
   a disk drive carrier holding the disk drive, the disk drive carrier including:
      a frame around three sides of the disk drive, the frame having a base and opposing sidewalls spatially separated by the base, each sidewall having an integrally formed pin that enters a corresponding hole in one of the opposite sides of the disk drive to position the disk drive within the frame; and
      a clip coupled to the frame where each sidewall terminates, the clip providing a fourth side to the frame opposite the base and causing the sidewalls of the frame to hold the disk drive tightly therebetween.

2. The disk drive assembly of claim 1, wherein the frame includes a post extending approximately orthogonally from an end of each sidewall, and the clip has a clip body with a pair of bent arms projecting from one side of the clip body, the clip coupling to the frame by wedging one of the posts of the frame between each arm and the clip body.

3. The disk drive assembly of claim 1, wherein the disk drive carrier further comprises an injector-ejector rotatably coupled to one end of the clip for pivotal movement between an open position and a closed position, one end of the injector-ejector having a projecting latch mechanism with a catch that extends from a surface thereof, and wherein the clip has an opening formed therein and a hook post projecting from one side of the clip near the opening, the latch mechanism entering the opening in the clip when the injector-ejector pivots to the closed position causing the catch to latch on to the hook post of the clip, thereby securing the injector-ejector in the closed position.

4. The disk drive assembly of claim 3, wherein the injector-ejector includes a pair of legs and a crossbeam extending between the legs, and the clip has a slot into which the crossbeam enters lengthwise to couple the injector-ejector to the clip without using a hardware fastener.

5. The disk drive assembly of claim 1, further comprising an adapter board abutting the base between the sidewalls of the frame and electrically connected to the disk drive.

6. The disk drive assembly of claim 5, wherein each sidewall of the frame has a flexible snap, the base of the frame has a pin projecting from an interior surface thereof, the adapter board has at least one opening to receive the pin, and the pin holds the adapter board in place when placed in the opening while the snaps of the sidewalls urge the adapter board against the base of the frame.

7. The disk drive assembly of claim 1, wherein the carrier-less disk drive is a 2.5" disk drive.

8. The disk drive assembly of claim 1, wherein the frame has a width that is approximately equal to the thickness of the disk drive.

9. The disk drive assembly of claim 1, wherein the frame is integrally constructed.

10. The disk drive assembly of claim 1, wherein the frame and clip cooperate to hold the disk drive without using a hardware fastener.

11. A data storage apparatus comprising:
   a chassis having a plurality of bays; and
   a disk drive assembly installed in one of the bays, the disk drive assembly comprising:

a carrier-less disk drive having opposite sides, each side having at least one hole formed therein;

a disk drive carrier holding the disk drive, the disk drive carrier including:

a frame around three sides of the disk drive, the frame having a base and opposing sidewalls spatially separated by the base, each sidewall having an integrally formed pin that enters a corresponding hole in one of the opposite sides of the disk drive to position the disk drive within the frame; and a clip coupled to the frame where each sidewall terminates, the clip providing a fourth side to the frame opposite the base and causing the sidewalls of the frame to hold the disk drive tightly therebetween.

12. The data storage apparatus of claim 11, wherein the frame includes a post extending approximately orthogonally from an end of each sidewall, and the clip has a clip body with a pair of bent arms projecting from one side of the clip body, the clip coupling to the frame by wedging one of the posts of the frame between each arm and the clip body.

13. The data storage apparatus of claim 11, wherein the disk drive carrier further comprises an injector-ejector rotatably coupled to one end of the clip for pivotal movement between an open position and a closed position, one end of the injector-ejector having a projecting latch mechanism with a catch that extends from a surface thereof, and wherein the clip has an opening formed therein and a hook post projecting from one side of the clip near the opening, the latch mechanism entering the opening in the clip when the injector-ejector pivots to the closed position causing the catch to latch on to the hook post of the clip, thereby securing the injector-ejector in the closed position.

14. The data storage apparatus of claim 13, wherein each bay of the chassis has an upper track and a corresponding lower track, the chassis has a raised lip at a front end of each lower track, and each lower track has a slot adjacent the raised lip, and wherein one end of the injector-ejector has a leg adjacent a cutout region that straddles the lip when the injector-ejector is rotated into the closed position, the leg entering the slot and urging the disk drive assembly into the bay.

15. The data storage apparatus of claim 13, wherein the injector-ejector includes a pair of legs and a crossbeam extending between the legs, and the clip has a slot into which the crossbeam enters lengthwise to couple the injector-ejector to the clip without using a hardware fastener.

16. The data storage apparatus of claim 11, further comprising an adapter board abutting the base between the sidewalls of the frame and electrically connected to the disk drive.

17. The data storage apparatus of claim 16, wherein each sidewall of the frame has a flexible snap, the base of the frame has a pin projecting from an interior surface thereof, the adapter board has at least one opening to receive the pin, and the pin holds the adapter board in place when placed in the opening while the snaps of the sidewalls urge the adapter board against the base of the frame.

18. The data storage apparatus of claim 11, wherein the carrier-less disk drive is a 2.5" disk drive.

19. The data storage apparatus of claim 11, wherein the frame has a width that is approximately equal to the thickness of the disk drive.

20. The data storage apparatus of claim 11, wherein the frame is integrally constructed.

21. The data storage apparatus of claim 11, wherein the frame and clip cooperate to hold the disk drive without using a hardware fastener.

22. A method for assembling a disk drive assembly, the method comprising:

rotatably coupling an injector-ejector to one end of a clip;

coupling one end of the clip to one of two opposing sidewalls of a three-sided carrier frame;

positioning a disk drive between the opposing sidewalls of the carrier frame so that integrally formed pins extending from interior surfaces of the opposing sidewalls can enter holes in opposite sides of the disk drive; and coupling an opposite end of the clip to the other of the opposing sidewalls of the carrier frame, with the pins of the sidewalls entering the holes in the opposite sides of the disk drive, to cause the sidewalls to hold the disk drive tightly in position therebetween.

23. The method of claim 22, further comprising the step of attaching an adapter board between the opposing sidewalls of the carrier frame.

24. The method of claim 23, further comprising the step of electrically connecting the disk drive to the adapter board.

25. The method of claim 23, further comprising the step of electrically connecting a midplane connector to the adapter board.

* * * * *